(12) United States Patent
Seo et al.

(10) Patent No.: US 9,886,957 B2
(45) Date of Patent: Feb. 6, 2018

(54) SYSTEM AND METHOD FOR VOICE RECOGNITION

(71) Applicant: SAMSUNG SDS CO., LTD., Seoul (KR)

(72) Inventors: Ji-Hyeon Seo, Seoul (KR); Jae-Young Lee, Seoul (KR); Byung-Wuek Lee, Seoul (KR); Kyung-Jun An, Seoul (KR)

(73) Assignee: SAMSUNG SDS CO., LTD., Seoul (KR)

(*) Notice: Subject to any disclaimer, the term of this patent is extended or adjusted under 35 U.S.C. 154(b) by 35 days.

(21) Appl. No.: 14/982,248

(22) Filed: Dec. 29, 2015

(65) Prior Publication Data

US 2017/0125020 A1    May 4, 2017

(30) Foreign Application Priority Data

Oct. 29, 2015   (KR) ........................ 10-2015-0151042

(51) Int. Cl.
| | |
|---|---|
| *G10L 15/16* | (2006.01) |
| *G10L 17/04* | (2013.01) |
| *G10L 15/14* | (2006.01) |
| *G10L 17/02* | (2013.01) |
| *G10L 17/18* | (2013.01) |
| *G06N 3/04* | (2006.01) |
| *G10L 15/08* | (2006.01) |

(52) U.S. Cl.
CPC ............ *G10L 17/04* (2013.01); *G06N 3/0445* (2013.01); *G06N 3/0454* (2013.01); *G10L 15/144* (2013.01); *G10L 17/02* (2013.01); *G10L 17/18* (2013.01); *G10L 15/08* (2013.01); *G10L 15/16* (2013.01)

(58) Field of Classification Search
None
See application file for complete search history.

(56) References Cited

U.S. PATENT DOCUMENTS

| | | | | |
|---|---|---|---|---|
| 6,253,178 | B1 * | 6/2001 | Robillard | G10L 15/08 704/238 |
| 8,554,555 | B2 * | 10/2013 | Gruhn | G10L 15/063 704/232 |
| 9,484,022 | B2 * | 11/2016 | Gruenstein | G10L 15/16 |
| 2010/0217589 | A1 * | 8/2010 | Gruhn | G10L 15/063 704/232 |
| 2017/0011738 | A1 * | 1/2017 | Senior | G10L 15/063 |

* cited by examiner

*Primary Examiner* — Richard Zhu
(74) *Attorney, Agent, or Firm* — Sughrue Mion, PLLC

(57) ABSTRACT

A voice recognition system and method are provided. The voice recognition system includes a voice input unit configured to receive learning voice data and a target label including consonant and vowel (letter) information representing the learning voice data, and divide the learning voice data into windows having a predetermined size; a first voice recognition unit configured to learn features of the divided windows using a first neural network model and the target label; a second voice recognition unit configured to learn a time-series pattern of the extracted features using a second neural network model; and a text output unit configured to convert target voice data input to the voice input unit into a text based on learning results of the first voice recognition unit and the second voice recognition unit, and output the text.

19 Claims, 12 Drawing Sheets

SYSTEM AND METHOD FOR VOICE RECOGNITION

CROSS-REFERENCE TO RELATED APPLICATION

This application claims priority to and the benefit of Korean Patent Application No. 2015-0151042, filed on Oct. 29, 2015, the disclosure of which is incorporated herein by reference in its entirety.

BACKGROUND

1. Field

Exemplary embodiments of the present disclosure relate to voice recognition technology, and more particularly, to neural network model-based voice recognition technology.

2. Discussion of Related Art

Conventionally, a hidden Markov model (HMM) is largely used for voice recognition. The HMM-based voice recognition method analyzes pronunciation from voice data, and combines a word or a sentence based on the analyzed pronunciation.

However, since the pronunciation is different according to a speaker, a type of language, etc., a correction operation is needed to be performed through much trials and error for analyzing the pronunciation and recognizing the voice. Further, there is a problem in which the HDD-based voice recognition method is vulnerable to peripheral noise since it recognizes the voice based on the pronunciation.

SUMMARY

The present disclosure is directed to a means for directly recognizing a text from a voice using a hybrid neural network model.

According to one aspect of the present disclosure, there is provided a voice recognition system, including: a voice input unit configured to receive learning voice data and a target label including consonant and vowel (letter) information representing the learning voice data, and divide the learning voice data into windows having a predetermined size; a first voice recognition unit configured to learn features of the divided windows using a first neural network model and the target label; a second voice recognition unit configured to learn a time-series pattern of extracted features using a second neural network model; and a text output unit configured to convert target voice data input to the voice input unit into a text based on learning results of the first voice recognition unit and the second voice recognition unit, and output the text.

The voice input unit may input two or more consecutive windows among the divided windows to the first voice recognition unit by configuring the two or more consecutive windows as one group.

The voice input unit may input the divided windows to the first voice recognition unit by decreasing the number of the divided windows according to a predetermined stride.

The first neural network model may be a convolutional neural network (CNN) model.

The second neural network model may be a recurrent neural network (RNN) model.

The second voice recognition unit may learn a candidate label regarding the target label using a connectionist temporal classification (CTC) method.

The first voice recognition unit may extract features of the target voice data based on the learning result of the first voice recognition unit, and the second voice recognition unit may extract a time-series pattern of features of the extracted target voice data based on the learning result of the second voice recognition unit, and may select a label corresponding to the extracted time-series pattern in the learned target label or the candidate label.

The text output unit may convert the selected label into a text, and output the text.

The voice recognition system may further include a learning control unit configured to control learning rates of the first voice recognition unit and the second voice recognition unit.

The learning control unit may maintain the learning rates of the first voice recognition unit and the second voice recognition unit to be the same before the learning of the first voice recognition unit is completed, and control the learning rate of the first voice recognition unit to be 0 when the learning of the first voice recognition unit is completed.

According to another aspect of the present disclosure, there is provided a voice recognition method, including: receiving learning voice data and a target label including consonant and vowel (letter) information representing the learning voice data, by a voice input unit; dividing the learning voice data into windows having a predetermined size, by the voice input unit; learning features of the divided windows using a first neural network model and the target label, by a first voice recognition unit; learning a time-series pattern of the extracted features using a second neural network model, by a second voice recognition unit; and converting target voice data input to the voice input unit into a text based on learning results of the first voice recognition unit and the second voice recognition unit, and outputting the text, by a text output unit.

After the dividing of the learning voice data by the window having the predetermined size, the voice recognition method may further include inputting two or more consecutive windows among the divided windows to the first voice recognition unit by configuring the two or more consecutive windows as one group, by the voice input unit.

The inputting of the two or more consecutive windows among the divided windows to the first voice recognition unit may include inputting the divided windows to the first voice recognition unit by decreasing the number of the divided windows according to a predetermined stride.

The first neural network model may be a convolutional neural network (CNN) model.

The second neural network model may be a recurrent neural network (RNN) model.

After the learning of the time-series pattern of the extracted features, the voice recognition method may further include learning a candidate label regarding the target label using a connectionist temporal classification (CTC) method, by the second voice recognition unit.

Before the converting of the target voice data input to the voice input unit into the text and outputting of the text, the voice recognition method may further include: extracting features of the target voice data based on the learning result of the first voice recognition unit, by the first voice recognition unit; and extracting the time-series pattern of the features of the extracted target voice data based on the learning result of the second voice recognition unit, and selecting a label corresponding to the extracted time-series pattern in the learned target label or the candidate label, by the second voice recognition unit.

The converting of the target voice data input to the voice input unit into the text and the outputting of the text may include converting the select label into the text, and outputting the text.

The voice recognition method may further include controlling learning rates of the first voice recognition unit and the second voice recognition unit, by a learning control unit.

The controlling of the learning rates may include maintaining the learning rates of the first voice recognition unit and the second voice recognition unit to be the same before the learning of the first voice recognition unit is completed, and controlling the learning rate of the first voice recognition unit to be 0 when the learning of the first voice recognition unit is completed.

According to still another aspect of the present disclosure, there is provided a computer program stored in a computer-readable recording medium for executing a method in combination with hardware, the method including: receiving learning voice data and a target label including consonant and vowel (letter) information representing the learning voice data, by a voice input unit; dividing the learning voice data into windows having a predetermined size, by the voice input unit; learning features of the divided windows using a first neural network model and the target label, by a first voice recognition unit; learning a time-series pattern of extracted features using a second neural network model, by a second voice recognition unit; and converting target voice data input to the voice input unit into a text based on learning results of the first voice recognition unit and the second voice recognition unit, and outputting the text, by a text output unit.

BRIEF DESCRIPTION OF THE DRAWINGS

The above and other objects, features, and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, exemplary embodiments of the present disclosure will be described with references to the accompanying drawings. The following description is provided in order to provide a comprehensive understanding with respect to a method, apparatus, and/or system described herein. However, this is merely for illustrative purposes, and the present disclosure is not limited thereto.

In the following description of the exemplary embodiments of the present disclosure, when it is determined that a detailed description of a well-known technology related to the present disclosure can unnecessarily obscure a subject matter of the present disclosure, the description will be omitted. All terms used herein are terms defined by considering functions in the present disclosure, and may be different according to intentions or customs of a user, or an operator. Accordingly, the terms should be defined based on the description in this specification. The terms used herein are only for describing exemplary embodiments according to the present disclosure, and should not be interpreted as being restrictive. Unless otherwise defined, the use of the singular form in the present document should not preclude the presence of more than one referent. It will be further understood that the terms "comprises," "comprising," "includes," and/or "including," when used herein, specify the presence of stated features, items, steps, operations, elements, components or a part or combinations thereof, but do not preclude the presence or addition of one or more other features, items, steps, operations, elements, components, or a part or combinations thereof.

Figure 1:
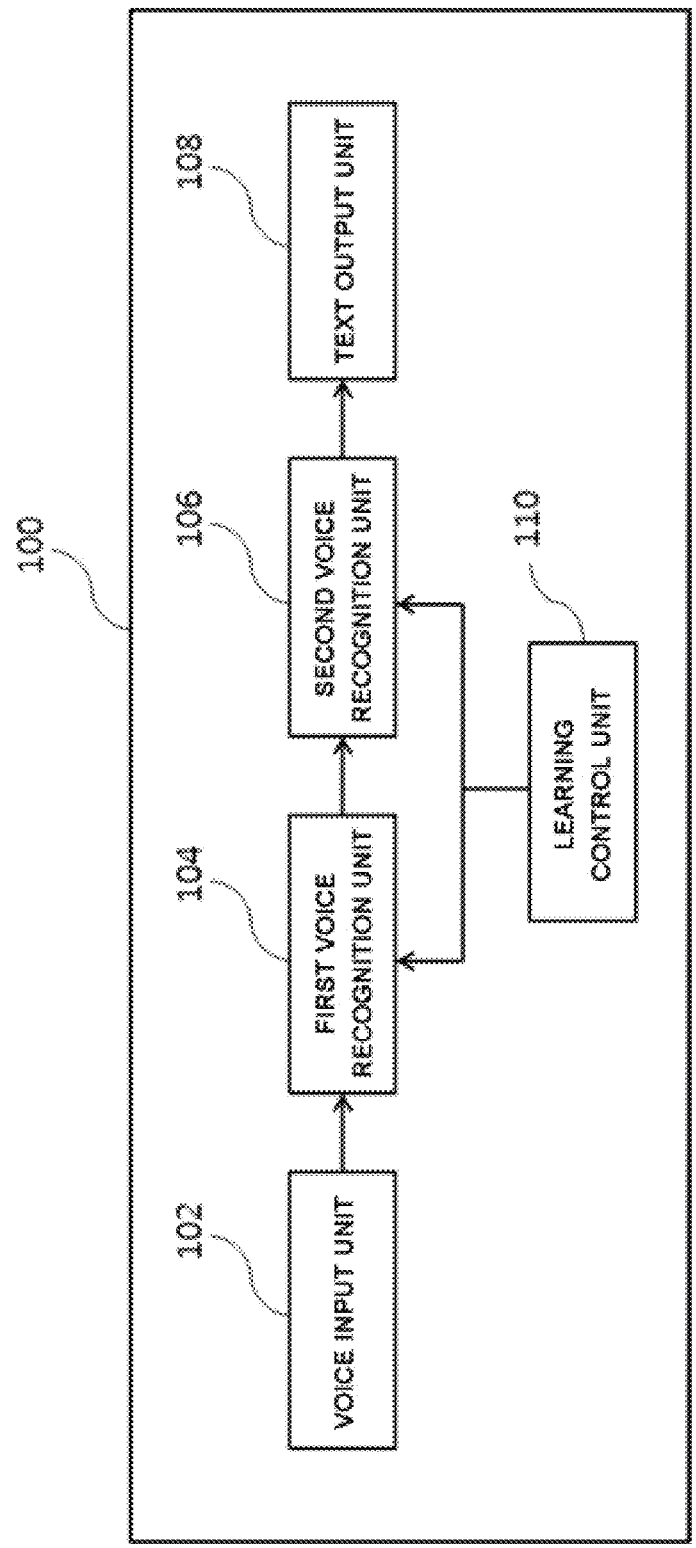
FIG. 1 is a block diagram illustrating a detailed configuration of a voice recognition system according to an exemplary embodiment of the present disclosure.

FIG. 1 is a block diagram illustrating a detailed configuration of a voice recognition system 100 according to an exemplary embodiment of the present disclosure. As shown in FIG. 1, the voice recognition system 100 according to an exemplary embodiment of the present disclosure may perform an end-to-end conversion operation of directly converting input voice data into a text and outputting the text, and include a voice input unit 102, a first voice recognition unit 104, a second voice recognition unit 106, a text output unit 108, and a learning control unit 110.

The voice input unit 102 may be a module for receiving the voice data. Here, the voice data may include a wave file for representing a voice signal in a waveform, a spectrogram representing the wave file in a frequency form, and a Mel-frequency Cepstral coefficient (MFCC), etc., in a broad sense. For example, the voice input unit 102 may receive the voice data from a sound device such as a microphone, a speaker, an audio device, etc. However, this is not limited thereto, and for example, the voice input unit 102 may receive the voice data from a communication device such as a desktop, a notebook, a tablet personal computer (PC), etc.

The voice data input to the voice input unit 102 may be target voice data or learning voice data. The target voice data may be voice data which is an actual recognition target, and the learning voice data may be voice data used for recognizing the target voice data and may be input to the voice input unit 102 for the learning of the voice recognition system 100.

The learning voice data may be input to the voice input unit 102 together with a target label representing the learning voice data. The target label may refer to result data on the learning voice data in a supervised learning of a neural network model. The target label may include consonant and vowel (or, letter) information representing the learning voice data. For example, the target label regarding the learning voice data "안녕하세요" may be "ㅇㅏㄴ ㄴㅕㅇㅎㅏㅅㅔㅇㅛ". Further, the target label may further include space information between the letters representing the learning voice data. For example, the target label regarding the learning voice data "안녕 반가워요" may be "ㅇㅏㄴㄴㅕㅇ$ㅂㅏㄴㄱㅏㅇㅝㅇㅛ". The space information may be represented as a predetermined symbol, for example, "$". An example of the target label is represented by the following Table 1.

TABLE 1

| Language | Target Label |
| --- | --- |
| Korean | ㅇㅏㄴㄴㅕㅇ$ㅂㅏㄴㄱㅏㅇㅝㅇㅛ |
| English | nice$to$meet$you |

Since the voice input unit 102 receives the letters, and the space information between the letters in the voice data as the target label and performs the learning, it may be easy to apply when recognizing a combined language (Hangeul) configuring one letter by combining the consonants and the vowels (for example, an initial consonant, a vowel, a final consonant, etc.) as well as the alphabet in which the consonants and the vowels themselves configures one letter. The voice input unit 102 may receive a plurality of pieces of learning voice data (for example, the learning voice data of 1400 sentences), and the target label regarding the learning voice data. As the amount of the learning voice data which is input to the voice input unit 102 is increased, a voice recognition rate by the first voice recognition unit 104 and the second voice recognition unit 106 which will be described hereinafter may be improved.

Further, the voice input unit 102 may divide the voice data (the target voice data or the learning voice data) into windows having a predetermined size (or length). For example, the predetermined size may be 25 ms, but the size of the dividing window is not limited thereto. Further, each dividing window in the voice input unit 102 may have a predetermined time difference. For example, each dividing window in the voice input unit 102 may have the time difference of 10 ms. Adjacent windows among the divided windows may have an overlapping portion of a predetermined size, and thus every portion of the voice data may be covered by the windows.

Further, the voice data may be tuned according to a characteristic of the voice data or a learning parameter (or a weighted value) of the first voice recognition unit 104 and the second voice recognition unit 106.

As one example, two or more consecutive windows among the divided windows in the voice input unit 102 may be grouped as one group, and the window group may be input to the first voice recognition unit 104 as one input. This may be for extracting a feature from their relationship by considering not only the voice represented at a current time t but also the voice connected before and after the current time t as one input. In exemplary embodiments which will be described hereinafter, the number of windows grouped as one input may be referred to as a height, for example, when the height is 9, the voice input unit 102 may input 9 windows to the first voice recognition unit 104 as one input.

In another example, the voice input unit 102 may input the divided windows to the first voice recognition unit 104 by decreasing the number of divided windows according to a predetermined stride. For example, the voice input unit 102 may divide the voice data while sliding by 10 ms increments using the window of 25 ms, and in this case, a portion of adjacent windows may be overlapped. When the stride is 0, each dividing window or each window group grouped according to the height may be input to the first voice recognition unit 104 as one input, but when the stride is 2, a next window or a next window group may be input to the first voice recognition unit 104 by skipping the window or the window group which is directly adjacent to the window or the window group which is input to the first voice recognition unit 104 among the divided windows or the window groups. Accordingly, the number of total windows input to the first voice recognition unit 104 may be decreased, and the voice data having continuity may be sparsely input to the first voice recognition unit 104. The values of the height and the stride may be set by an analyst or a manager, and the voice input unit 102 may tune the voice data according to the values of the height and the stride and input the tuned voice data to the first voice recognition unit 104.

The first voice recognition unit 104 and the second voice recognition unit 106 may be a module for learning the learning voice data using a deep learning-based neural network model, and recognizing the target voice data based on the learning result.

First, the first voice recognition unit 104 may learn a feature of the learning voice data using a first neural network model. Here, for example, the first neural network model may be a convolutional neural network (CNN) model. The CNN model may be a hierarchical model used for finally extracting a feature of input data by alternately performing two calculation layers (a convolutional layer, a subsampling (pooling) layer). The first voice recognition unit 104 may perform machine learning of the divided windows and the target label which are input from the voice input unit 102 using the CNN model. As described above, the target label may include the letters and the space information between the letters of the learning voice data which is input to the voice input unit 102. The first voice recognition unit 104 may learn filters of each convolutional layer using the CNN model, and thus learn the features of the learning voice data, that is, the letters and the space information between the letters. The CNN model may be configured as a plurality of layers, since the features are extracted/learned/classified in stages, the CNN model may have an advantage of being less affected by the peripheral noise compared with a conventional voice recognition model. The first voice recognition unit 104 may learn the consonants and the vowels and the space information corresponding to the input learning voice data through the machine learning, and extract the feature of the target voice data input subsequently (extract whether the target voice data which is input has any consonants and vowels and space information) based on the learned information (that is, the consonants and the vowels and the space information corresponding to the learning voice data).

Next, the second voice recognition unit 106 may learn the time-series pattern (or a temporal pattern) of the features extracted by the first voice recognition unit 104 using a second neural network model. Here, for example, the second neural network model may be a recurrent neural network (RNN) model. The RNN model may be a model used for extracting a time-series correlation (or connection relation) of the input data. The second voice recognition unit 106 may perform the machine learning of the features extracted by the first voice recognition unit 104 using the RNN model. For example, the RNN model may be a bi-directional neural network (BRNN) model, and the BRNN model may include a forward layer (a layer for learning from the front) and a backward layer (a layer for learning from the rear) according to a direction of extracting/learning the time-series correlation of data. The second voice recognition unit 106 may learn the time-series pattern of the features, for example, whether certain consonants and vowels are mainly located after any consonant and vowel and whether certain consonants and vowels are mainly located before any consonant and vowel, etc., by applying the BRNN model to the features extracted by the first voice recognition unit 104. The second voice recognition unit 106 may extract and learn the time-series pattern, and represent the learning result as a probability. For example, when the extracted feature is "ㅁㅏㄴㅎㅇㅡㄴ", the second voice recognition unit 106 may extract and learn the time-series pattern of the consonant and vowel, that is, the time-series pattern in which the consonant "ㅁ" is located before the vowel "ㅏ", the time-series pattern in which the consonant "ㄴ" or "ㅎ" is located after the vowel "ㅏ".

Further, the second voice recognition unit 106 may learn a candidate label regarding the target label using a connectionist temporal classification (CTC) method. The CTC method may be a method used for classifying and estimating the time-series pattern of the input data. Even when the input data is the voice data of the same content, the label of the voice data (the letters, and the space information between the letters) may be different according to the speaker of the sounds included in the voice data. For example, the sounds uttered by a speaker A (for example, the sounds represented by the label "-ㅂㅏ---ㅁ-") and the sounds uttered by a speaker B (for example, the sounds represented by the label "ㅂ-ㅏㅏㅏ-ㅁ") may represent the same meaning, but may have different long or short sounds. Here, "-" may be a blank, and represent a sound which is not classified as the label. Accordingly, there may be a plurality of labels corresponding to one word. The labels may be referred to as the candidate label on the target label (for example, "ㅂㅏㅁ"), and the second voice recognition unit 106 may learn the candidate label regarding the target label using the CTC method. The second voice recognition unit 106 may learn a plurality of candidate labels from a plurality of pieces of learning voice data and the target labels corresponding thereto. For example, the second voice recognition unit 106 may generate the label by classifying the learning voice data into the consonant and vowel or the space at every time t, calculate a similarity between the label and the target label, and learn the candidate label using a back-propagation through time (BPTT) method. Accordingly, the second voice recognition unit 106 may classify the long/short sound of the voice data according to whether the voice data is classified as a blank or the consonant and the vowel at the same time t. In the example described above, the long/short sound of the voice data on the word "밤" may be classified as the following Table 2.

TABLE 2

| Label | Text |
|---|---|
| -ㅂㅏ---ㅁ- | 밤 |
| ㅂ-ㅏㅏㅏ-ㅁ | 밤: |

The second voice recognition unit 106 may learn the time-series pattern extracted by the first voice recognition unit 104, and extract the time-series pattern of the features of the target voice data which is input through the first voice recognition unit 104 subsequently based on the learned information (that is, the time-series pattern of the consonants and the vowels, and the space). Further, the second voice recognition unit 106 may select the label corresponding to the time-series pattern extracted among the learned target label or the candidate label.

Meanwhile, here, an example in which the first neural network model and the second neural network model are the CNN model and the RNN model, respectively, is described, but is not limited thereto, and every model or algorithm of performing a similar function may variably be applied.

The text output unit 108 may be a module for converting the target voice data input to the voice input unit 102 into a text based on the learning results of the first voice recognition unit 104 and the second voice recognition unit 106, and outputting the text. As described above, the first voice recognition unit 104 may learn the features of the learning voice data, and the second voice recognition unit 106 may learn the time-series pattern of the features. The text output unit 108 may convert the target label and the candidate label into the text by combining the initial consonant, the vowel, and the final consonant, etc. of each of the target label regarding the learning voice data and the candidate label regarding the target label. For example, when the target label regarding the voice data "안녕하세요" is "ㅇㅏㄴㄴㅕㅇㅎㅏㅅㅔㅇㅛ", the text output unit 108 may convert "ㅇㅏㄴㄴㅕㅇㅎㅏㅅㅔㅇㅛ" into the text "안녕하세요" by combining the initial consonant, the vowel, and the final consonant, etc. of "ㅇㅏㄴㄴㅕㅇㅎㅏㅅㅔㅇㅛ". In this case, the text output unit 108 may combine the initial consonant, the vowel, and the final consonant, etc. of the target label by referencing a predetermined dictionary. For example, the text output unit 108 may configure the text by combining the initial consonant, the vowel, and the final consonant, etc. of the target label, and determine whether the configured text is in the dictionary, and thus accuracy of the text conversion may be improved. However, the method in which the text output unit 108 converts the selected label into the text is not limited thereto, and the text output unit 108 may convert the target label and the candidate label into the text in various methods. Accordingly, the first voice recognition unit 104 and the second voice recognition unit 106 may learn the text information on the learning voice data, the text output unit 108 may convert the target voice data which is newly input to the voice input unit 102 into the text based on the learning result, and output the text.

In detail, the first voice recognition unit 104 may extract the features of the target voice data based on the learning result, and the second voice recognition unit 106 may extract the time-series pattern of the features of the voice data extracted by the first voice recognition unit 104 based on the learning result, and select a label corresponding to the extracted time-series pattern in the learned target label or the candidate label. Further, the text output unit 108 may convert the selected label into the text based on the learning result. For example, when the selected label is "ㅂ-- ㅏ ㅏ ㅏ-ㅁ", the text output unit 108 may output the text "밤" corresponding to the label. That is, according to exemplary embodiments of the present disclosure, an entire operation for recognizing the sounds may be simplified by performing the end-to-end conversion operation of directly converting the voice data into the text and outputting the text, without the operation of analyzing the pronunciation on the voice data based on the neural network model-based learning result.

The learning control unit 110 may be a module for controlling learning rates of the first voice recognition unit 104 and the second voice recognition unit 106. As described above, the first voice recognition unit 104 and the second voice recognition unit 106 may recognize the voice using the CNN model and the RNN model, respectively. However, convergence (completion) speeds regarding the learning of the CNN model and the RNN model may be different. Here, the convergence of the learning may refer to a state in which a parameter, that is, a weighted value, of the neural network model is not changed any more (that is, is not updated).

In detail, the filters of the CNN model may perform the learning at high speed compared with the filters of the RNN model. This may be because the RNN model further learns temporal information of the input data while the CNN model learns only spatial information of the input data. For this reason, when learning in the CNN model and the RNN model using the same learning rate, the RNN model may need to perform the learning longer, and in this case, since a parameter value (for example, the weighted value) of the CNN model is changed after the filters of the CNN model are converged, the CNN model may be an obstacle to the learning of the RNN model. Further, when learning in the RNN model after sufficiently learning in only the CNN model, continuity of the input data may not be sufficiently reflected. For this reason, in exemplary embodiments of the present disclosure, the learning control unit 110 may control the learning rates of the first voice recognition unit 104 and the second voice recognition unit 106. In detail, the learning control unit 110 may maintain the learning rates of the first voice recognition unit 104 and the second voice recognition unit 106 to be the same before the learning by the first voice recognition unit 104 is completed (active state training), and control the learning rate of the first voice recognition unit 104 to be 0 when the learning by the first voice recognition unit 104 is completed (inactive state training). Here, when controlling the learning rate to be 0, the parameter value (for example, the weighted value) of the CNN model may not be updated any longer. The learning control unit 110 may repeatedly perform the active state training operation and the inactive state training operation, and thus the voice recognition rate of the voice recognition system 100 may be improved.

In an embodiment, the voice input unit 102, the first voice recognition unit 104, and the second voice recognition unit 106, the text output unit 108, and the learning control unit 110 may be implemented in a computing device including one or more processors and a computer-readable recording (storage) medium connected to the processors. The computer-readable recording (storage) medium may be located inside or outside the processors, and may be connected to the processors by various means which are well known. The processor inside the computing device may allow each computing device to operate according to an exemplary embodiment which will be described herein. For example, the processor may execute instructions stored in the computer-readable recording (storage) medium, and when the instructions stored in the computer-readable recording (storage) medium are executed by the processor, the processor may be configured to allow the computing device to operate according to an exemplary embodiment which will be described herein.

The above modules of the voice recognition system 100 may be implemented with hardware. For example, the voice recognition system 100 may be implemented or included in a computing apparatus. The computing apparatus may include at least one processor and a computer-readable storage medium such as a memory that is accessible by the processor. The computer-readable storage medium may be disposed inside or outside the processor, and may be connected with the processor using well known means. A computer executable instruction for controlling the computing apparatus may be stored in the computer-readable storage medium. The processor may execute an instruction stored in the computer-readable storage medium. When the instruction is executed by the processor, the instruction may allow the processor to perform an operation according to an example embodiment. In addition, the computing apparatus may further include an interface device configured to support input/output and/or communication between the computing apparatus and at least one external device, and may be connected with an external device (for example, a device in which a system that provides a service or solution and records log data regarding a system connection is implemented). Furthermore, the computing apparatus may further include various different components (for example, an input device and/or an output device), and the interface device may provide an interface for the components. Examples of the input device include a pointing device such as a mouse, a keyboard, a touch sensing input device, and a voice input device, such as a microphone. Examples of the output device include a display device, a printer, a speaker, and/or a network card. Thus, the voice input unit 102, the first voice recognition unit 104, the second voice recognition unit 106, the text output unit 108, and the learning control unit 110 of the voice recognition system 100 may be implemented as hardware of the above-described computing apparatus.

Figure 2:
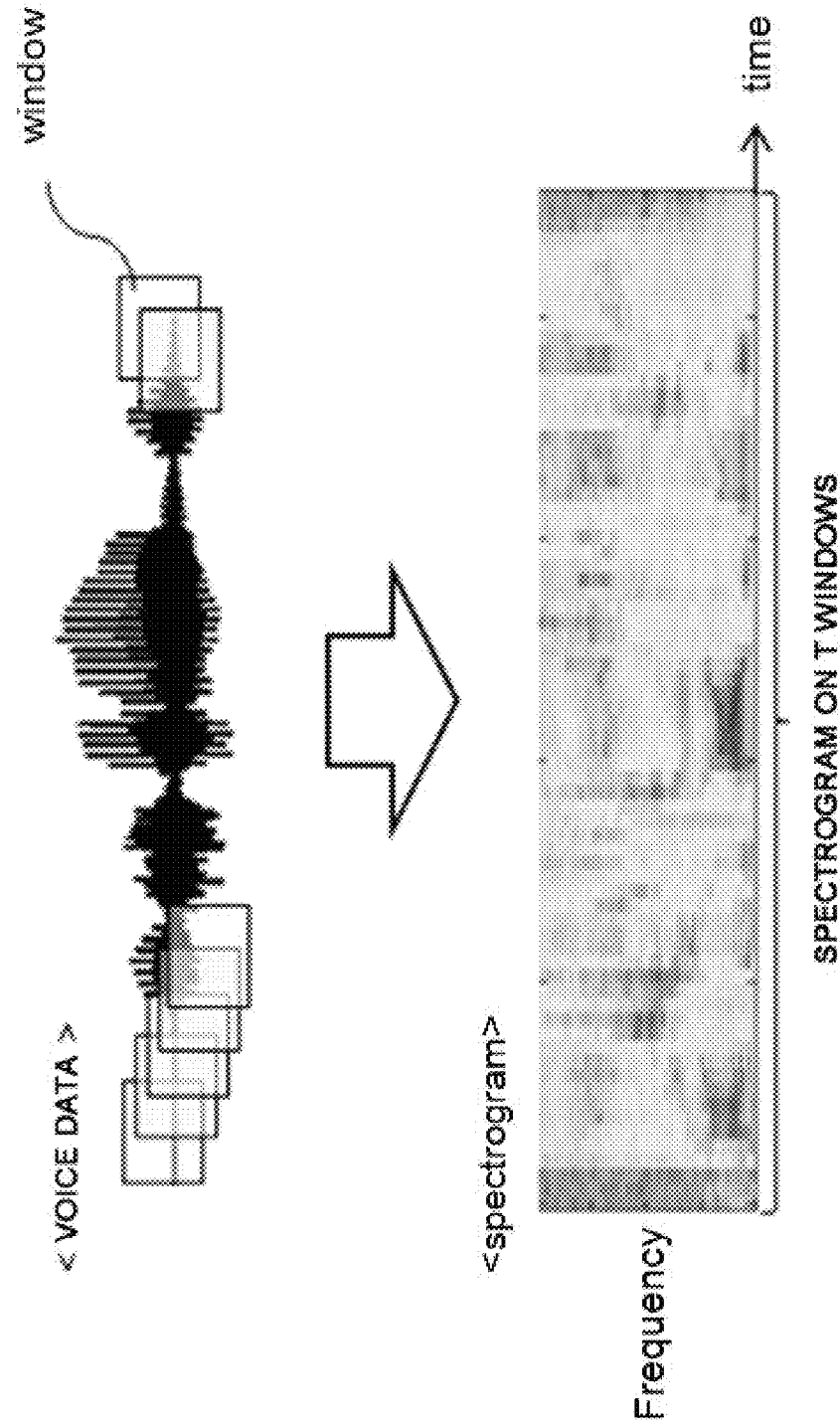
FIG. 2 is a diagram for describing an operation of dividing voice data by a voice input unit according to an exemplary embodiment of the present disclosure.

FIG. 2 is a diagram for describing an operation of dividing voice data by a voice input unit 102 according to an exemplary embodiment of the present disclosure. As shown in FIG. 2, the voice input unit 102 may divide the voice data (the target voice data or the learning voice data) into windows having a predetermined size (or length).

Further, for example, the voice input unit 102 may divide the voice data into T windows while sliding by 10 ms increments using the window of 25 ms. In FIG. 2, an operation in which the voice data is divided into T windows and a spectrogram on the dividing T windows are illustrated.

Figure 3:
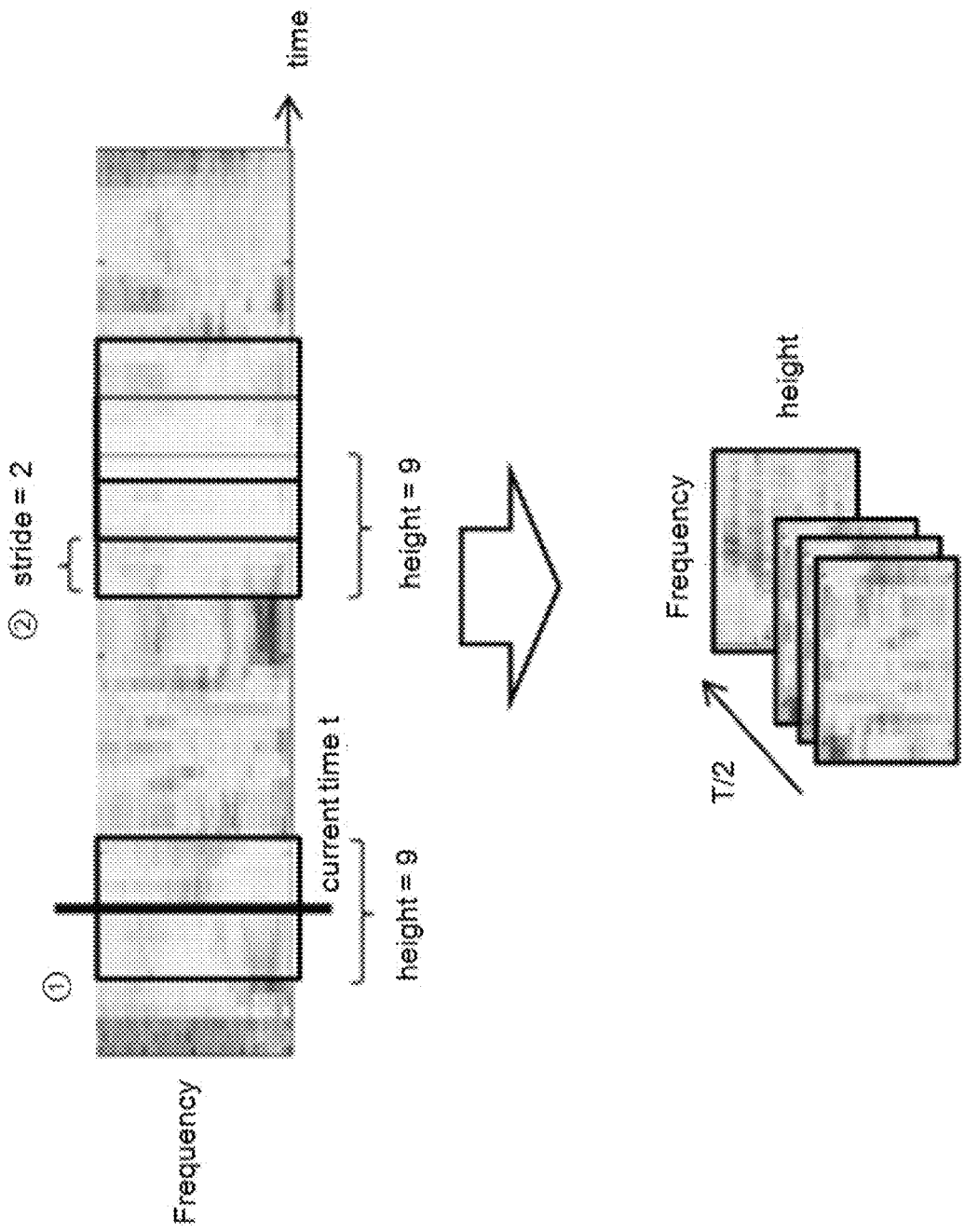
FIG. 3 is a diagram illustrating an example of tuned voice data according to an exemplary embodiment of the present disclosure.

FIG. 3 is a diagram illustrating an example of tuned voice data according to an exemplary embodiment of the present disclosure. As described above, the voice data input to the voice input unit 102 may be tuned according to the characteristic of the voice data or the learning parameter (or the weighted value) of the first voice recognition unit 104 and the second voice recognition unit 106.

First, two or more consecutive windows among the divided windows in the voice input unit 102 may be configured as one group. For example, when the height is 9, 9 windows may be configured as one group, and may be input to the first voice recognition unit 104.

Next, the voice input unit 102 may input the divided windows to the first voice recognition unit 104 by decreasing the number of divided windows according to a predetermined stride. For example, when the stride is 2, the voice input unit 102 may sequentially input a first window group, a third window group, a fifth window group, . . . , etc. among the window groups to the first voice recognition unit 104, and not input a second window group, a fourth window group, a sixth window group, . . . etc. to the first voice recognition unit 104. Accordingly, the number of total windows input to the first voice recognition unit 104 may be decreased, and the voice data having the continuity may be sparsely input to the first voice recognition unit 104.

Figure 4:
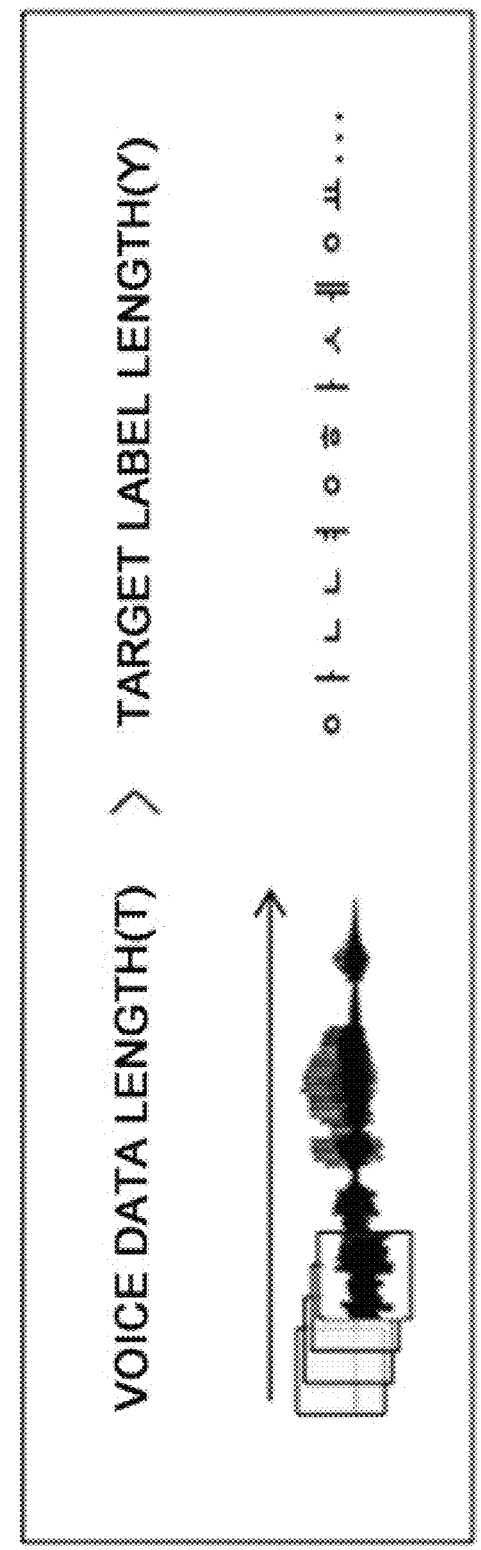
FIG. 4 is a diagram for describing a relation between voice data and a target label according to an exemplary embodiment of the present disclosure.

FIG. 4 is a diagram for describing a relation between voice data and a target label according to an exemplary embodiment of the present disclosure. As shown in FIG. 4, a length Y of the target label may not be greater than a length T of the voice data. Here, the length Y of the target label may refer to the number of symbols representing the letters and the space between the letters, and the length T of the voice data may refer to the number of divided windows. Since a plurality of windows correspond to one consonant and vowel according to the long and short sound included in the voice data or the pronunciation of the speaker of the sounds, the length T of the voice data may be greater than the length Y of the target label. For example, when the target label is "ㅇㅏㄴㄴㅕㅇㅎㅏㅅㅔㅇㅛ", the consonants and the vowels of ㅇ, ㅇ, ㅇ, ㅏ, ㅏ, ㄴ, ㄴ, ㄴ, ㅕ, ㅇ may correspond to the divided windows, respectively, and in this case, the length T of the voice data may be greater than the length Y of the target label. When inputting the voice data recorded in high speed to the first voice recognition unit 104 by changing the stride parameter, the length T of the voice data may be changed and may be smaller than the length Y of the target label, and for this reason, the voice data may be tuned to be suitable for a feature of the voice data and a structure of a voice recognition model.

Figure 5:
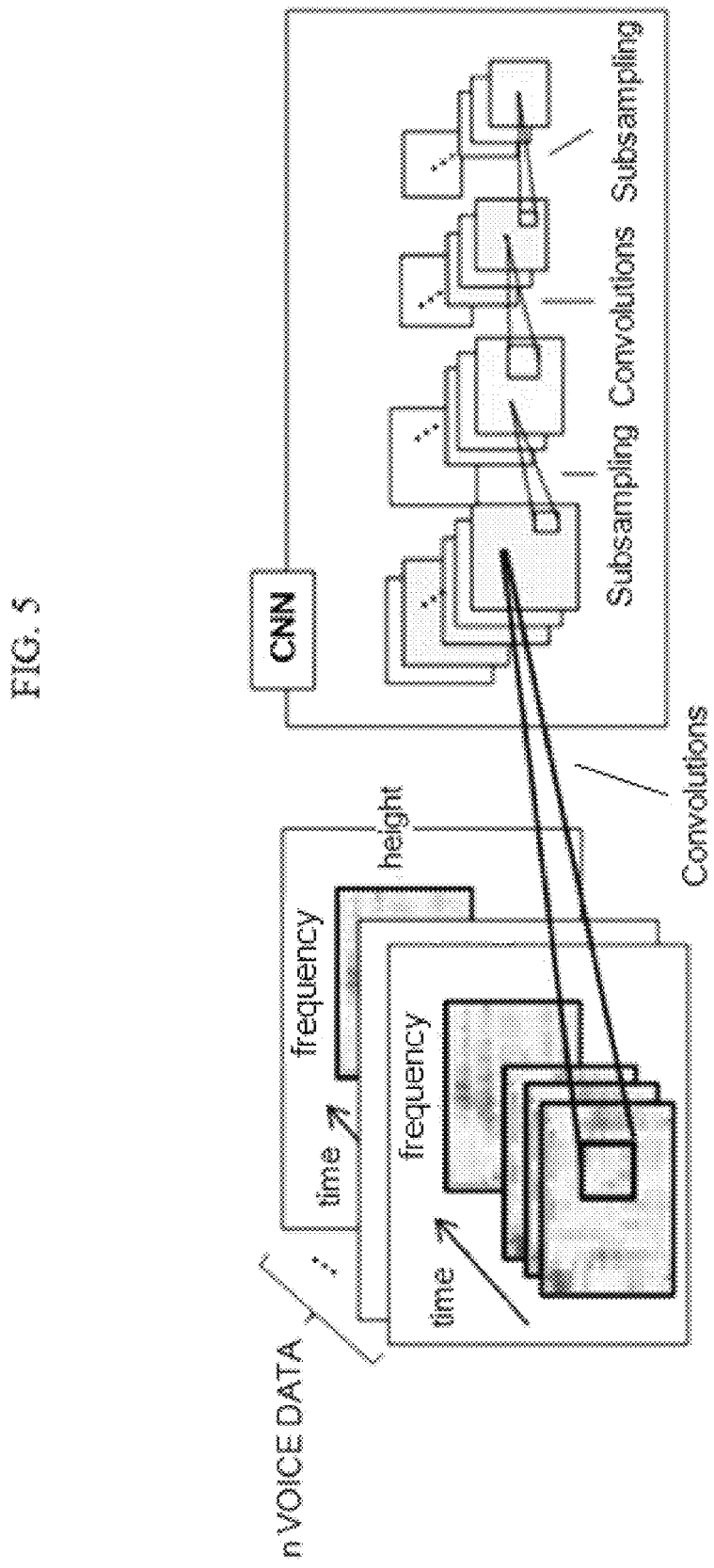
FIG. 5 is a diagram for describing an operation of extracting a feature of voice data by a first voice recognition unit according to an exemplary embodiment of the present disclosure.

FIG. 5 is a diagram for describing an operation of extracting a feature of voice data by a first voice recognition unit 104 according to an exemplary embodiment of the present disclosure. As described above, the first voice recognition unit 104 may extract the feature of the voice data using the CNN model. Generally, the CNN model may have three layers as shown below.

① Convolution layer: a layer for extracting a convolution feature

② Pooling layer: a layer of sub-sampling in order to decrease a feature

③ Feedforward layer: a layer of classifying a feature extracted by the convolution layer, the pooling layer as a last layer The first voice recognition unit 104 may perform the machine learning on the divided windows and the target label input from the voice input unit 102 using the CNN model. The first voice recognition unit 104 may learn the filters of each convolution layer using the CNN model, and thus learn the feature on the learning voice data, that is, the consonant and vowel and the space information between the consonant and vowel. Further, the first voice recognition unit 104 may extract the features of the target voice data input subsequently (that is, extracting any consonant and vowel, and space information in the target voice data) based on the learned information (that is, the consonants and vowels, and space information corresponding to the voice data).

Figure 6:
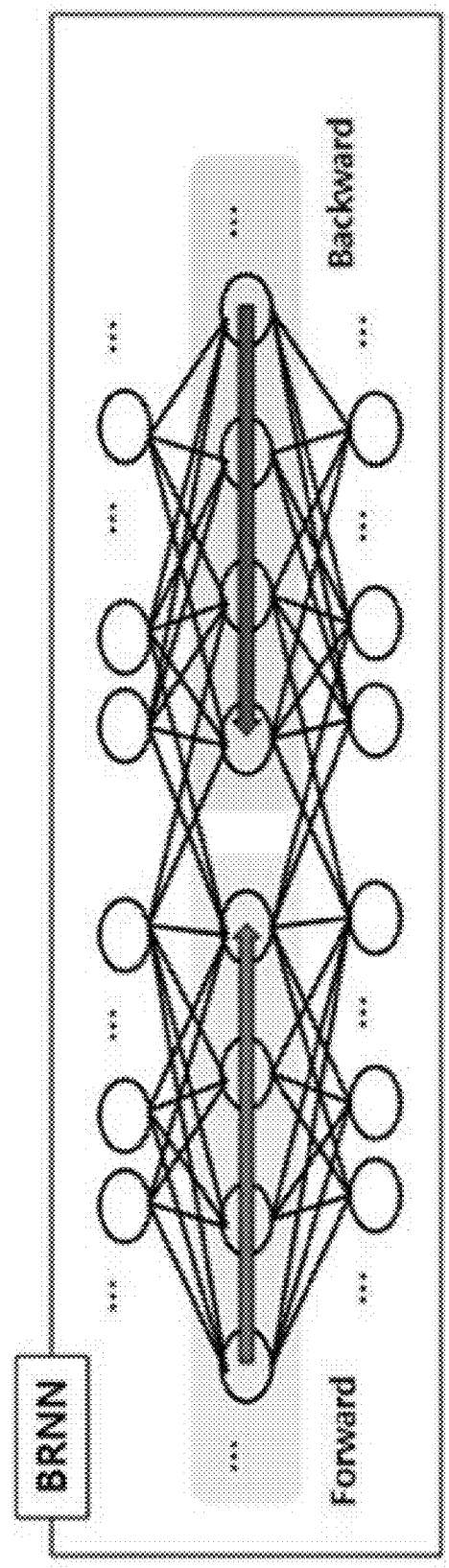
FIG. 6 is a diagram for describing an operation of extracting a time-series pattern of voice data by a second voice recognition unit according to an exemplary embodiment of the present disclosure.

FIG. 6 is a diagram for describing an operation of extracting a time-series pattern of voice data by a second voice recognition unit 106 according to an exemplary embodiment of the present disclosure. As described above, the second voice recognition unit 106 may extract the time-series pattern of the features recognized by the first voice recognition unit 104 using the RNN model. For example, the RNN model may be the BRNN model, and the BRNN model may include the forward layer and the backward layer according to a direction of extracting/learning the time-series correlation of the data. The second voice recognition unit 106 may learn the time-series pattern of the features, for example, whether certain consonants and vowels are mainly located after any consonant and vowel and whether certain consonants and vowels are mainly located before any consonant and vowel, etc. by applying the BRNN model to the features extracted by the first voice recognition unit 104.

Figure 7:
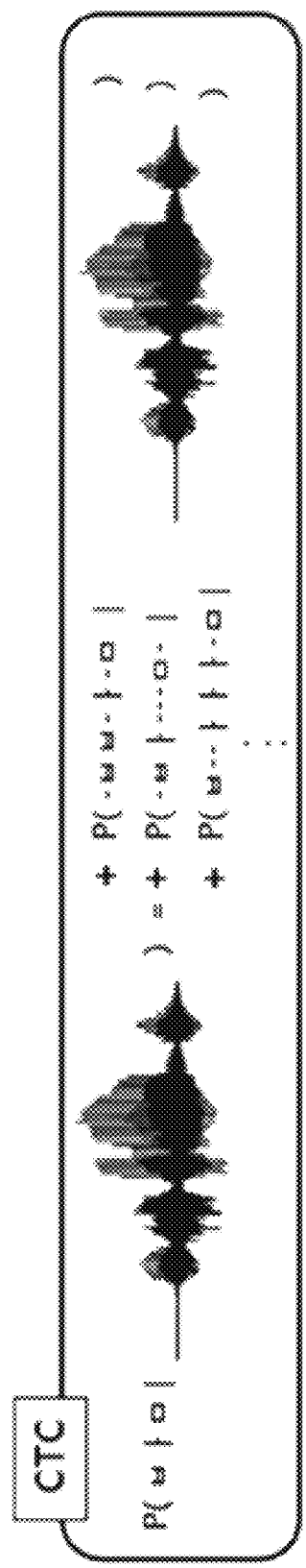
FIG. 7 is a diagram for describing an operation of learning a candidate label on a target label by a second voice recognition unit according to an exemplary embodiment of the present disclosure.

FIG. 7 is a diagram for describing an operation of learning a candidate label on a target label by a second voice recognition unit 106 according to an exemplary embodiment of the present disclosure. As described above, the second voice recognition unit 106 may learn the candidate label regarding the target label using the CTC method. The second voice recognition unit 106 may learn a plurality of candidate labels from a plurality of pieces of learning voice data and the target label corresponding thereto. For example, the second voice recognition unit 106 may generate a label by classifying the learning voice data as the consonant and vowel or the space at every time t, calculate a similarity between the label and the target label, and learn the candidate label using the BPTT method.

Referring to FIG. 7, the second voice recognition unit 106 may extract and learn a layer of a combination having the greatest possibility on the target label "ㅂㅏㅁ", that is, "-ㅂㅂ-ㅏ-ㅁ", "-ㅂㅏ---ㅁ- ㅂ--ㅏㅏ-ㅁ", etc. Further, the second voice recognition unit 106 may classify the long/short sound of the voice data according to whether to be classified as a blank or the consonant and vowel at the same time t.

Figure 8:
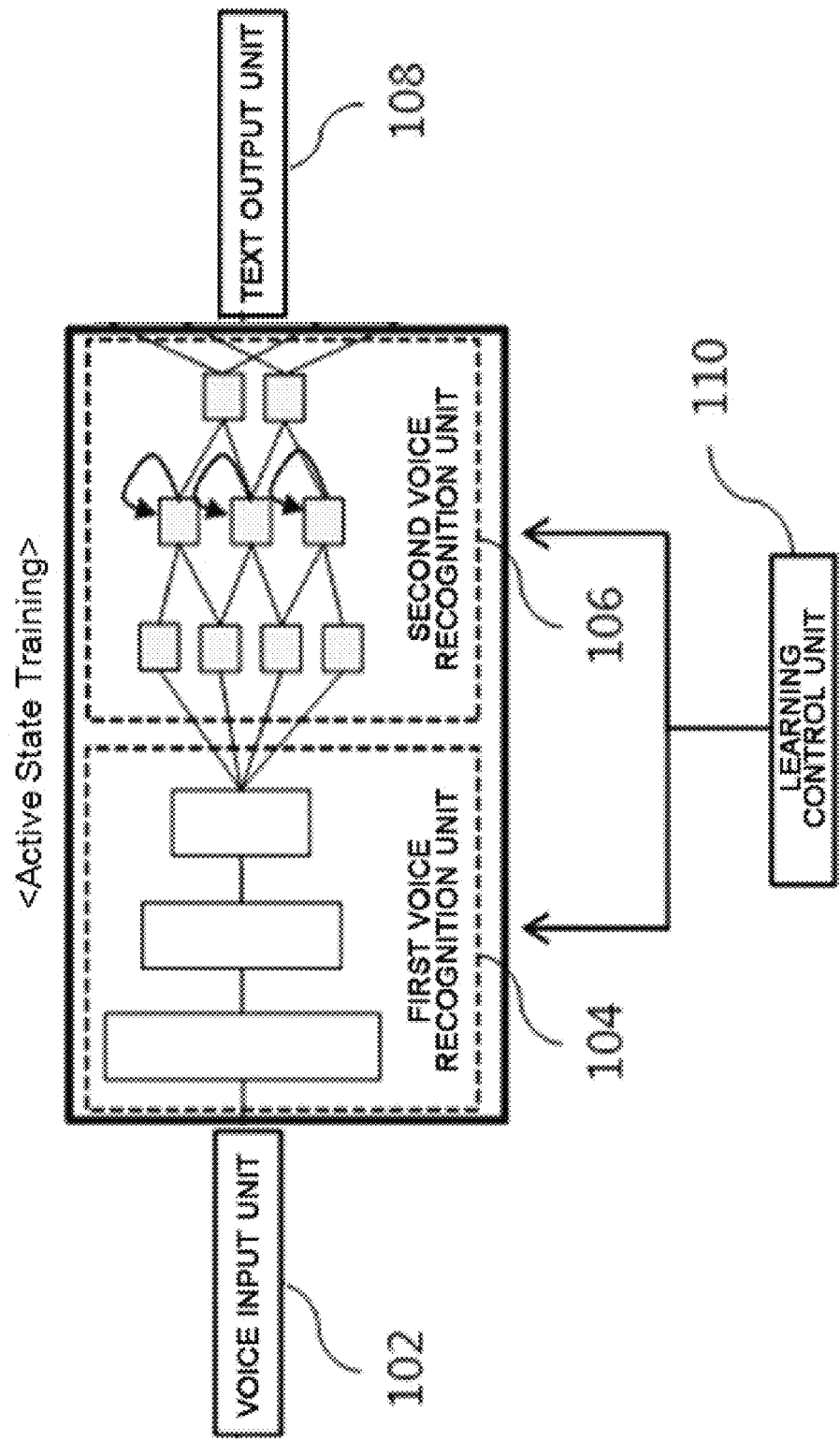
FIG. 8 is a diagram for describing an operation of controlling a learning rate of a first voice recognition unit and a second voice recognition unit by a learning control unit according to one exemplary embodiment of the present disclosure.
Figure 9:
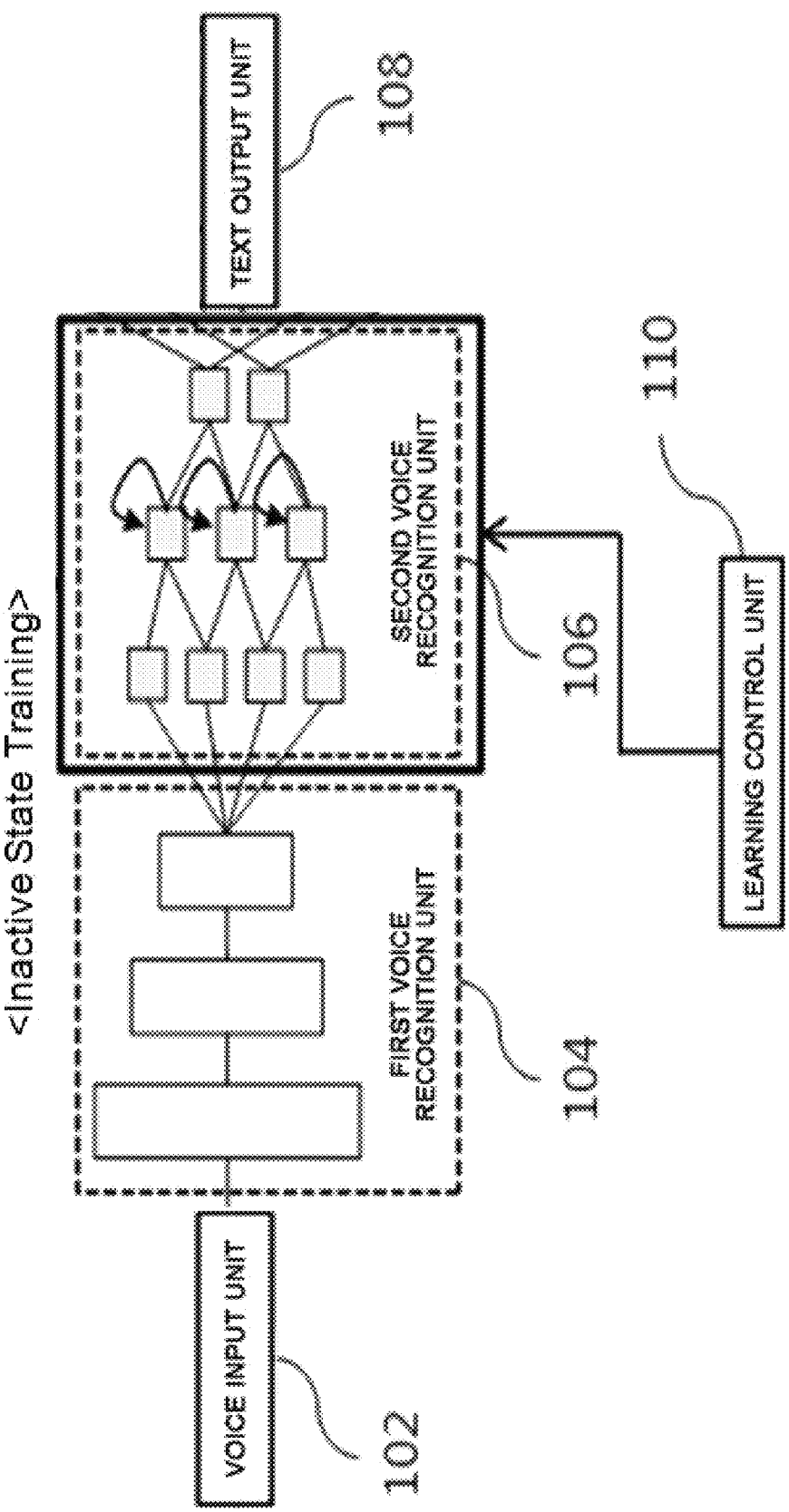
FIG. 9 is a diagram for describing an operation of controlling a learning rate of a first voice recognition unit and a second voice recognition unit by a learning control unit according to another exemplary embodiment of the present disclosure.

FIGS. 8 and 9 are diagrams for describing an operation of controlling learning rates of the first voice recognition unit 104 and the second voice recognition unit 106 by a learning control unit 110 according to exemplary embodiments of the present disclosure. As described above, the learning control unit 110 may maintain the learning rates of the first voice recognition unit 104 and the second voice recognition unit 106 to be the same before the learning of the first voice recognition unit 104 is completed, and control the learning rate of the first voice recognition unit 104 to be 0 when the learning of the first voice recognition unit 104 is completed.

FIG. 8 illustrates an operation in which the active state training operation is performed, and FIG. 9 illustrates an operation in which the inactive state training operation is performed. The learning control unit 110 may repeatedly perform the active state training operation and the inactive state training operation, and thus the voice recognition rate of the voice recognition system 100 may be improved.

Figure 10:
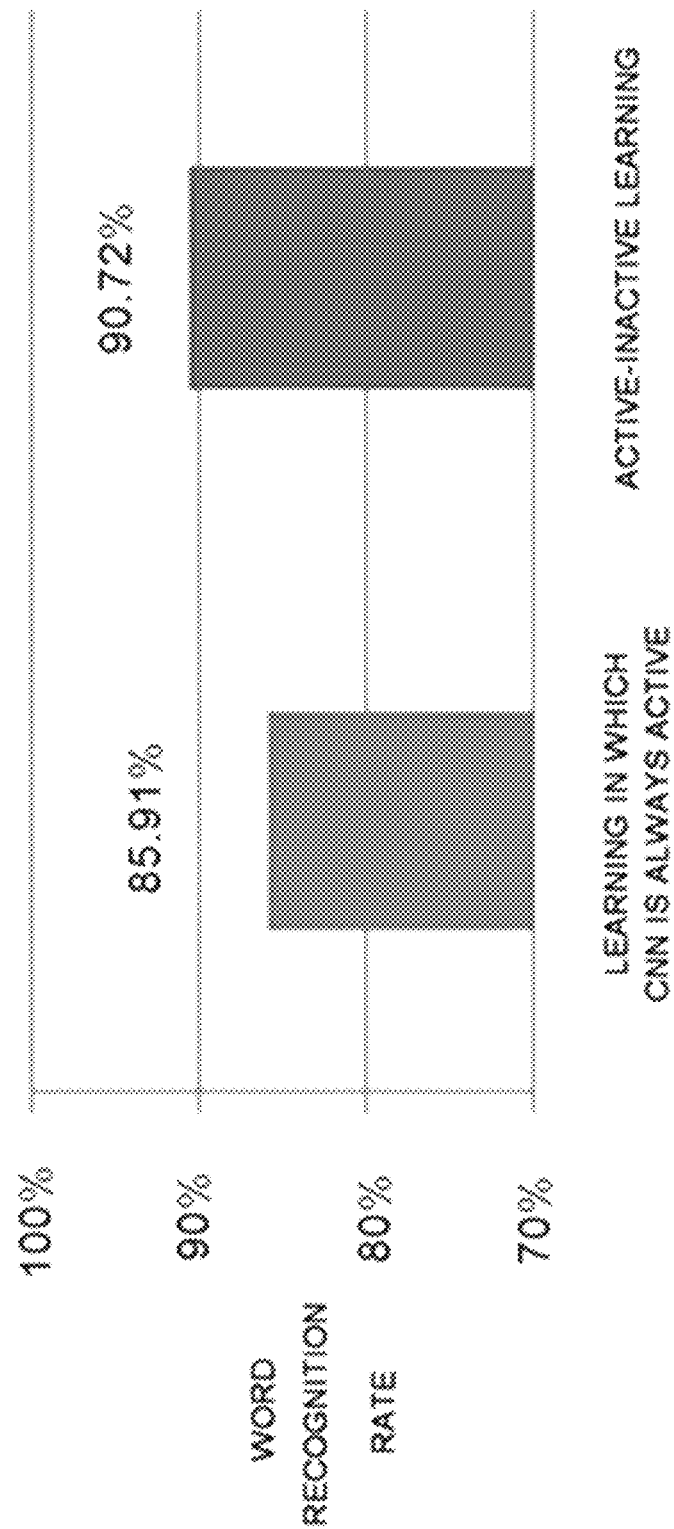
FIG. 10 is a diagram for describing a voice recognition rate improvement effect according to the learning control by the learning control unit according to an exemplary embodiment of the present disclosure.

FIG. 10 is a diagram for describing a voice recognition rate improvement effect according to the learning control of the learning control unit 110 according to an exemplary embodiment of the present disclosure. As described above, the learning control unit 110 may repeatedly perform the active state training operation and the inactive state training operation.

As shown in FIG. 10, when the active state training operation and the inactive state training operation are repeated performed by the control of the learning control unit 110, it may be confirmed that a word recognition rate is greatly increased (85.91%→90.72%) compared with a case in which the learning is maintained in the CNN model. In order to obtain the experiment result, 1400 sentences are input to the voice input unit 102 as the learning voice data, and after this, 400 sentences are input to the voice input unit 102 as the test voice data (that is, the target voice date). For example, the number of words of each sentence may average about 6.7.

Figure 11:
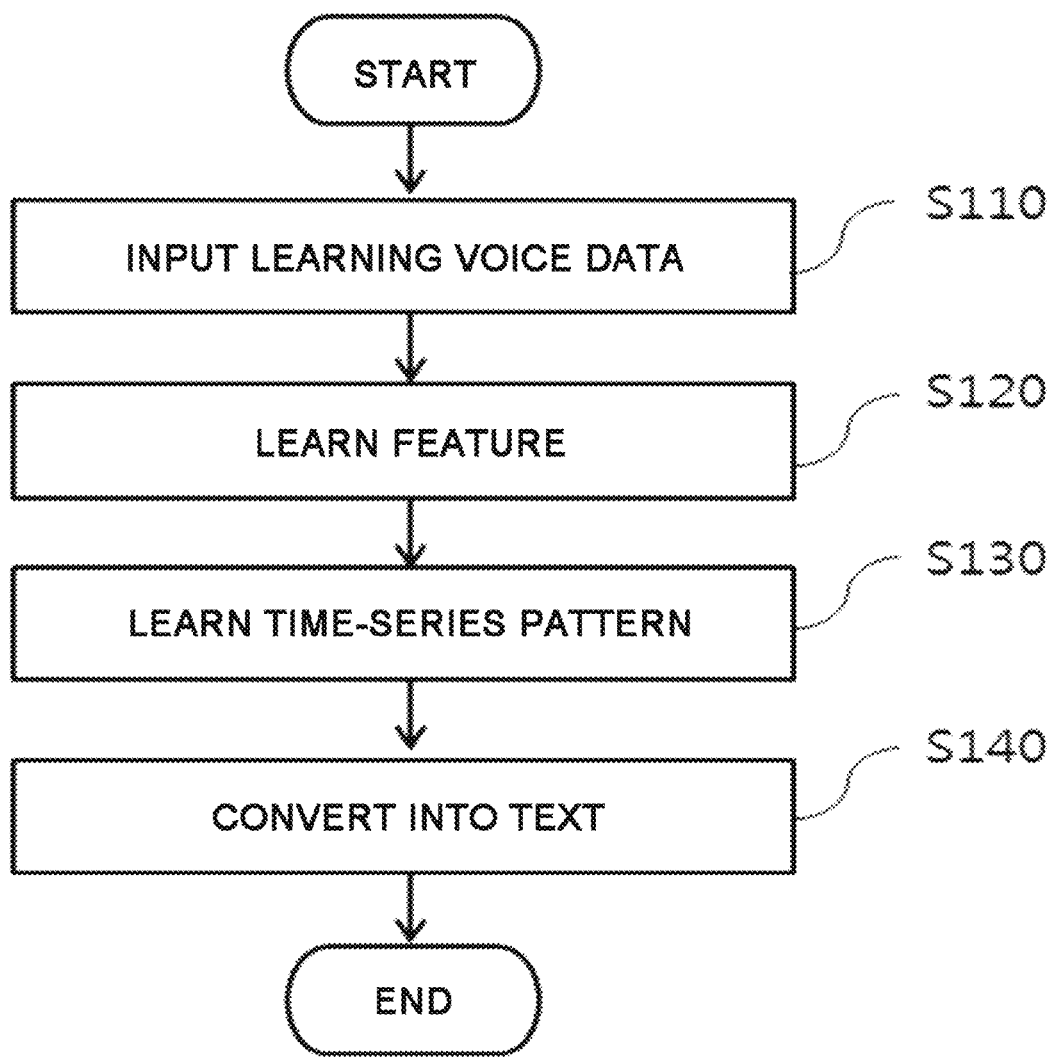
FIG. 11 is a flowchart for describing a method of learning learning voice data according to an exemplary embodiment of the present disclosure.

FIG. 11 is a flowchart for describing a method of learning the learning voice data according to an exemplary embodiment of the present disclosure. In the flowchart illustrated, the method is described by dividing into a plurality of operations, but at least one portion of the plurality of operations may be performed by changing the order, may be performed by being combined with another operation, may be omitted, may be performed by being divided into sub-operations, or may be performed by adding one or more operations which are not shown.

In operation S110, the voice input unit 102 may receive the learning voice data. For example, the voice input unit 102 may receive the voice data from a sound device such as a microphone, a speaker, an audio device, etc. In this case, the voice input unit 102 may receive the target label representing the learning voice data together with the learning voice data. The target label may include the letters and the space information between the letters, on the learning voice data. The voice input unit 102 may divide the learning voice data into windows having the predetermined size, and each dividing window may be input to the first voice recognition unit 104.

In operation S120, the first voice recognition unit 104 may learn the features of each of the windows input from the voice input unit 102. For example, the first voice recognition unit 104 may learn the features of each window using the first neural network model. Here, for example, the first neural network model may be the CNN model. The first voice recognition unit 104 may learn the filters of each convolution layer using the CNN model, and learn the features of the learning voice data, that is, the letters and the space information between the letters.

In operation S130, the second voice recognition unit 106 may learn the time-series pattern of the features extracted by the first voice recognition unit 104. For example, the second voice recognition unit 106 may learn the time-series pattern using the second neural network model. Here, for example, the second neural network model may be the BRNN model. The second voice recognition unit 106 may learn the time-series pattern of the features, for example, whether certain consonants and vowels are mainly located after any consonant and vowel and whether certain consonants and vowels are mainly located before any consonant and vowel, etc., by applying the BRNN model to the features extracted by the first voice recognition unit 104. Further, the second voice recognition unit 106 may learn the candidate label regarding the target label using the CTC method. For example, the second voice recognition unit 106 may generate the label by classifying the learning voice data as the consonant and the vowel or the space at every time t, calculate the similarity between the label and the target label, and learn the candidate label using the BPTT method.

In operation S140, the text output unit 108 may convert the learning voice data into the text. The text output unit 108 may convert the target label and the candidate label into the text by combining the initial consonant, the vowel, and the final consonant, etc. of each of the target label regarding the learning voice data and the candidate label regarding the target label. Through this operation, the voice recognition system 100 may learn the text corresponding to the learning voice data.

Figure 12:
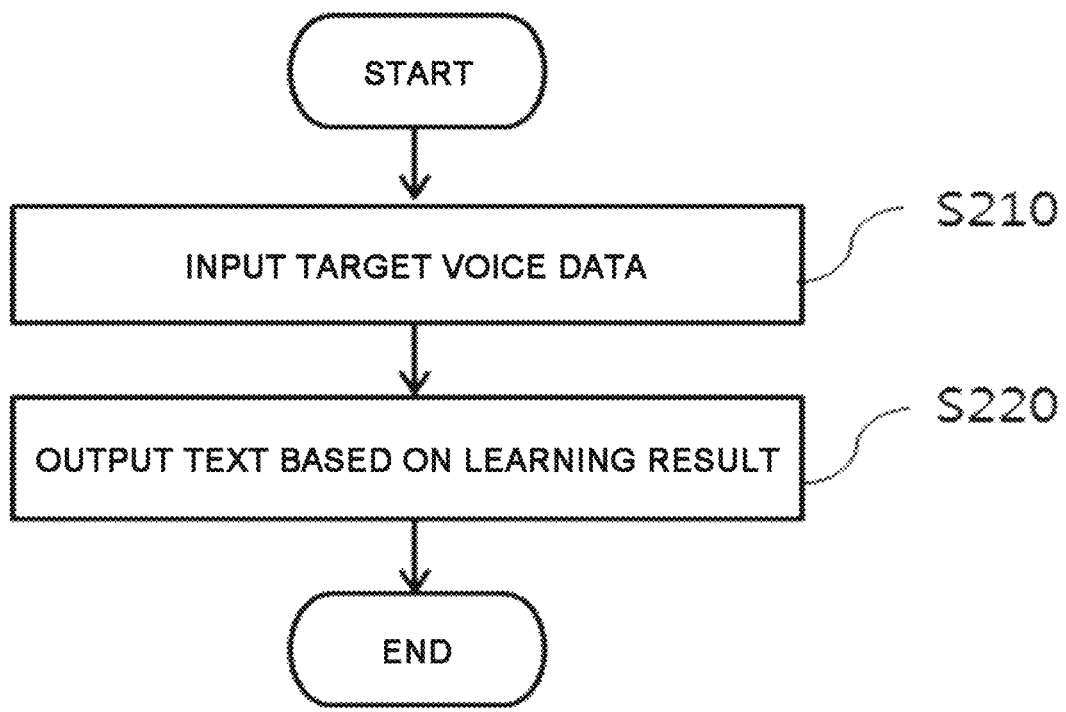
FIG. 12 is a flowchart for describing a voice recognition method according to an exemplary embodiment of the present disclosure.

FIG. 12 is a flowchart for describing a voice recognition method according to an exemplary embodiment of the present disclosure.

In operation S210, the voice input unit 102 may receive the target voice data.

In operation S220, the text output unit 108 may output the text corresponding to the target voice data based on the learning results of the first voice recognition unit 104 and the second voice recognition unit 106. In detail, the first voice recognition unit 104 may extract the features of the target voice data based on the learning result, and the second voice recognition unit 106 may extract the time-series pattern of the features of the extracted target voice data based on the learning result, and select the label corresponding to the extracted time-series pattern in the learned target label or candidate label. Accordingly, the text output unit 108 may convert the selected label into the text corresponding to the label, and output the text.

Meanwhile, an exemplary embodiment of the present disclosure may include a program which is executable in a computer, and a computer-readable recording medium including the program. The computer-readable recording medium may include program instructions, a local data file, a local data structure, etc. alone or in combination. The computer readable recording medium may be specially designed and configured for the present disclosure, or may be a medium which is generally used in the computer software field. Examples of the computer-readable recording medium may include a hard disk, a magnetic media such as a floppy disk and a magnetic tape, an optical recording media such as a compact disk read-only memory (CD-ROM) and a digital video disk (DVD), a magneto-optical media such as a floptical disk, and a hardware device which is specially configured to store and execute a program instruction such as a ROM, a random access memory (RAM), a flash memory, etc. Examples of the program instruction may include not only machine code made by a compiler but also high-level language code which is executable by a computer using an interpreter, etc.

According to exemplary embodiments of the present disclosure, an entire operation for the voice recognition can be simplified by performing the end-to-end conversion operation of directly converting the voice data into the text and outputting the text without the operation of analyzing the pronunciation on the voice data based on the neural network model-based learning result.

Further, according to exemplary embodiments of the present disclosure, it can be easily applied to recognize the combined language (for example, Hangeul) configuring one letter by combining the consonant and the vowel (for example, the initial consonant, the vowel, the final consonant, etc.) as well as the alphabet in which the consonant and the vowel themselves configure one letter by inputting the consonant and the vowel and the space information between the consonant and the vowel on the voice data as the target label and performing the learning.

Moreover, according to exemplary embodiments of the present disclosure, the voice recognition rate can be improved by controlling the learning rates of the first voice recognition unit and the second voice recognition unit.

While the exemplary embodiments of the present disclosure are described in detail above, it will be understood by those of ordinary skill in the art that various changes and modifications in form and details may be made therein without departing from the spirit and scope as defined by the following claims. Accordingly, the scope of the present disclosure is not limited by the exemplary embodiments of the present disclosure, it is intended that the present disclosure covers all such modifications and changes of those of ordinary skill in the art derived from a basic concept of the appended claims, and their equivalents.

What is claimed is:

1. A voice recognition system, comprising:
a voice input unit, executed by at least one hardware device, configured to receive learning voice data and a target label including consonant and vowel (letter) information and space information between letters representing the learning voice data, and divide the learning voice data into windows having a predetermined size;
a first voice recognition unit, executed by the at least one hardware device, configured to learn features of the divided windows using a first neural network model and the target label;
a second voice recognition unit, executed by the at least one hardware device, configured to learn a time-series pattern of extracted features using a second neural network model; and
a text output unit, executed by the at least one hardware device, configured to convert target voice data input to the voice input unit into a text based on learning results of the first voice recognition unit and the second voice recognition unit, and output the text,
wherein the second voice recognition unit learns a candidate label regarding the target label based on the letter information and the space information,
the first voice recognition unit extracts features of the target voice data based on the learning result of the first voice recognition unit, and
the second voice recognition unit extracts the time-series pattern of features of the extracted target voice data based on the learning result of the second voice recognition unit, and selects a label corresponding to the extracted time-series pattern in the learned target label and the candidate label.

2. The voice recognition system of claim 1, wherein the voice input unit inputs two or more consecutive windows among the divided windows to the first voice recognition unit by configuring the two or more consecutive windows as one group.

3. The voice recognition system of claim 2, wherein the voice input unit inputs the divided windows to the first voice recognition unit by decreasing the number of the divided windows according to a predetermined stride.

4. The voice recognition system of claim 1, wherein the first neural network model is a convolutional neural network (CNN) model.

5. The voice recognition system of claim 4, wherein the second neural network model is a recurrent neural network (RNN) model.

6. The voice recognition system of claim 5, wherein the second voice recognition unit learns a candidate label regarding the target label using a connectionist temporal classification (CTC) method.

7. The voice recognition system of claim 1, wherein the text output unit converts the selected label into a text, and outputs the text.

8. The voice recognition system of claim 1, further comprising:
a learning control unit, executed by the at least one hardware device, configured to control learning rates of the first voice recognition unit and the second voice recognition unit.

9. The voice recognition system of claim 8, wherein the learning control unit maintains the learning rates of the first voice recognition unit and the second voice recognition unit to be the same before the learning of the first voice recognition unit is completed, and controls the learning rate of the first voice recognition unit to be 0 when the learning of the first voice recognition unit is completed.

10. A voice recognition method, comprising:
receiving learning voice data and a target label including consonant and vowel (letter) information and space information between letters representing the learning voice data, by a voice input unit executed by at least one hardware device;
dividing the learning voice data into windows having a predetermined size, by the voice input unit executed by the at least one hardware device;
learning features of the divided windows using a first neural network model and the target label, by a first voice recognition unit executed by the at least one hardware device;
learning a time-series pattern of extracted features using a second neural network model, by a second voice recognition unit executed by the at least one hardware device;
learning a candidate label regarding the target label based on the letter information and the space information, by the second voice recognition unit;
extracting features of the target voice data based on the learning result of the first voice recognition unit, by the first voice recognition unit;
extracting the time-series pattern of the features of the extracted target voice data based on the learning result of the second voice recognition unit, and selecting a label corresponding to the extracted time-series pattern in the learned target label or the candidate label, by the second voice recognition unit; and
converting target voice data input to the voice input unit into a text based on learning results of the first voice recognition unit and the second voice recognition unit, and outputting the text, by a text output unit.

11. The voice recognition method of claim 10, after the dividing of the learning voice data into the windows having the predetermined size, further comprising:
inputting two or more consecutive windows among the divided windows to the first voice recognition unit by configuring the two or more consecutive windows as one group, by the voice input unit.

12. The voice recognition method of claim 11, wherein the inputting of the two or more consecutive windows among the divided windows to the first voice recognition unit includes inputting the divided windows to the first voice recognition unit by decreasing the number of the divided windows according to a predetermined stride.

13. The voice recognition method of claim 10, wherein the first neural network model is a convolutional neural network (CNN) model.

14. The voice recognition method of claim 13, wherein the second neural network model is a recurrent neural network (RNN) model.

15. The voice recognition method of claim 14, wherein the learning a candidate label regarding the target label includes
learning the candidate label regarding the target label using a connectionist temporal classification (CTC) method.

16. The voice recognition method of claim 10, wherein the converting of the target voice data input to the voice input unit into the text and the outputting of the text includes converting the selected label into the text, and outputting the text.

17. The voice recognition method of claim 10, further comprising:
controlling learning rates of the first voice recognition unit and the second voice recognition unit, by a learning control unit executed by the at least one hardware device.

18. The voice recognition method of claim 17, wherein the controlling of the learning rates includes maintaining the learning rates of the first voice recognition unit and the second voice recognition unit to be the same before the learning of the first voice recognition unit is completed, and controlling the learning rate of the first voice recognition unit to be 0 when the learning of the first voice recognition unit is completed.

19. A computer program stored in a non-transitory computer-readable recording medium for executing a method in combination with hardware, the method comprising:
receiving learning voice data and a target label including consonant and vowel (letter) information and space information between letters representing the learning voice data, by a voice input unit;
dividing the learning voice data into windows having a predetermined size, by the voice input unit;
learning features of the divided windows using a first neural network model and the target label, by a first voice recognition unit;
learning a time-series pattern of extracted features using a second neural network model, by a second voice recognition unit;
learning a candidate label regarding the target label based on the letter information and the space information, by the second voice recognition unit;
extracting features of the target voice data based on the learning result of the first voice recognition unit, by the first voice recognition unit;
extracting the time-series pattern of the features of the extracted target voice data based on the learning result of the second voice recognition unit, and selecting a label corresponding to the extracted time-series pattern in the learned target label or the candidate label, by the second voice recognition unit; and
converting target voice data input to the voice input unit into a text based on learning results of the first voice recognition unit and the second voice recognition unit, and outputting the text, by a text output unit.

\* \* \* \* \*